(12) United States Patent
Lu et al.

(10) Patent No.: US 9,579,784 B2
(45) Date of Patent: Feb. 28, 2017

(54) CONNECTING STRUCTURE-CONTAINED CONNECTION DEVICE OF ELECTRIC TOOL FOR CONNECTION WITH ANGLE ADJUSTER

(71) Applicant: Metabowerke GmbH, Nuertingen (DE)

(72) Inventors: Zhengguo Lu, Shanghai (CN); Wei Wang, Shanghai (CN); Rui Wu, Shanghai (CN); Lidong Xu, Shanghai (CN); Yiqian Zhang, Shanghai (CN)

(73) Assignee: Metabowerke GmbH, Nuertingen (DE)

( * ) Notice: Subject to any disclaimer, the term of this patent is extended or adjusted under 35 U.S.C. 154(b) by 0 days.

(21) Appl. No.: 14/577,496

(22) Filed: Dec. 19, 2014

(65) Prior Publication Data

US 2015/0266178 A1 Sep. 24, 2015

Related U.S. Application Data

(63) Continuation-in-part of application No. 14/576,750, filed on Dec. 19, 2014.

(30) Foreign Application Priority Data

Dec. 19, 2013 (CN) .................... 2013 2 0842019 U

(51) Int. Cl.
*B23B 31/107* (2006.01)
*B25F 5/00* (2006.01)
(Continued)

(52) U.S. Cl.
CPC ................. *B25F 5/00* (2013.01); *B25F 3/00* (2013.01); *F16D 1/108* (2013.01);
(Continued)

(58) Field of Classification Search
CPC . B23B 31/1071; B23B 2231/04; B23B 51/12; B25F 3/00; Y10T 279/17752;
(Continued)

(56) References Cited

U.S. PATENT DOCUMENTS 4,273,344 A * 6/1981 Benson ............... B23B 31/1071
279/75
2001/0046421 A1* 11/2001 Cochran ............... B23B 31/005
408/239 R (Continued)

FOREIGN PATENT DOCUMENTS

CZ    EP 1749620 A1 *  2/2007 ........... B23B 45/003
DE    EP 2383076 A2 * 11/2011 ................ B25F 3/00

OTHER PUBLICATIONS

Machine translation of "Auxiliary device for a hand machine tool and hand machine tool with same", EPO patent publication, EP 2383076A2, Goos, F. et al., Nov. 2, 2011.*

*Primary Examiner* — Eric A Gates
*Assistant Examiner* — Chwen-Wei Su
(74) *Attorney, Agent, or Firm* — GrayRobinson, P.A.; Donald S. Showalter

(57) ABSTRACT

A connecting device may have a tooth-shaped jacket, a locking body internally of the tooth-shaped jacket, a plurality of balls, a spring, and a spring base. The locking body has a rear end with an annular groove and has a neck with a plurality of spherical recesses containing the balls. Radial positioning between the locking body and the tooth-shaped jacket is realized through the balls. The spring is connected between the tooth-shaped jacket and the spring base and axial positioning between the spring base and the locking body is realized through a snap ring in the annular groove.

2 Claims, 3 Drawing Sheets

(51) Int. Cl.
*F16D 1/108* (2006.01)
*B25F 3/00* (2006.01)
*B23B 51/12* (2006.01)
*F16D 1/116* (2006.01)

(52) U.S. Cl.
CPC ........... *B23B 31/1071* (2013.01); *B23B 51/12* (2013.01); *B23B 2231/04* (2013.01); *F16D 1/116* (2013.01); *Y10T 279/3406* (2015.01); *Y10T 279/3412* (2015.01); *Y10T 408/957* (2015.01)

(58) Field of Classification Search
CPC ......... Y10T 279/3412; Y10T 279/3406; Y10T 279/3418; Y10T 408/957
USPC .............................................. 81/57.13, 57.29
See application file for complete search history.

(56) References Cited

U.S. PATENT DOCUMENTS

| | | | | |
|---|---|---|---|---|
| 2005/0191139 A1* | 9/2005 | Hofbrucker | ........... | B25B 21/007 408/239 A |
| 2011/0127731 A1* | 6/2011 | Woecht | ................... | B25F 3/00 279/143 |
| 2014/0017023 A1* | 1/2014 | Grollmund | ......... | B23B 51/0473 408/239 A |
| 2014/0131959 A1* | 5/2014 | Tussing | ................... | B25F 3/00 279/143 |

\* cited by examiner

CONNECTING STRUCTURE-CONTAINED CONNECTION DEVICE OF ELECTRIC TOOL FOR CONNECTION WITH ANGLE ADJUSTER

CROSS REFERENCE TO RELATED APPLICATIONS

This application is a continuation-in-part of, and claims priority under 35 U.S.C. §120 to, co-pending commonly owned, U.S. patent application Ser. No. 14/576,750 entitled "CONNECTING STRUCTURE-CONTAINED CONNECTION DEVICE OF ELECTRICAL TOOL FOR CONNECTION WITH ANGLE ADJUSTER" which was filed in the United States on Dec. 19, 2014 and which in turn claimed priority under 35 U.S.C. §119 to commonly owned, Chinese application Serial No. 201320842019.1 entitled "CONNECTING STRUCTURE-CONTAINED CONNECTION DEVICE OF ELECTRICAL TOOL FOR CONNECTION WITH ANGLE ADJUSTER" which was filed in China on Dec. 19, 2013, now Chinese Utility Model No. CN 203665475 U.

INCORPORATION BY REFERENCE

Above-referenced U.S. patent application Ser. No. 14/576,750 and Chinese application Serial No. 201320842019.1, both entitled "CONNECTING STRUCTURE-CONTAINED CONNECTION DEVICE OF ELECTRICAL TOOL FOR CONNECTION WITH ANGLE ADJUSTER", are both hereby expressly incorporated by reference herein in their entireties to form a part of the present disclosure.

FIELD OF THE INVENTION

The invention relates to an accessory of an electric tool, and more particularly, to a connection device for connecting an electric tool with an angle adjuster.

BACKGROUND OF THE INVENTION

Connection devices for connecting an angle adjuster and electric tool have typically included an axial fixture and a connection bushing. The axial restraint and the angle of rotation of the angle adjuster are realized through the axial fixture and the connection bushing. To use the electric tool, it is necessary to position the connection bushing at a right angle in order to snap it into place. In addition, considerable effort is needed to turn the angle adjuster. As a result, the combined use of the axial fixture and the connection bushing make it hard to use the angle adjuster and the entire operation requires more time and effort to complete.

BRIEF SUMMARY OF THE INVENTION

The invention provides a connecting connection device for connecting an electric tool for connection with an angle adjuster so that the operation of the angle adjuster on the electric tool will be more efficient and convenient.

A connecting device for connecting an electric tool with an angle adjuster comprises a tooth-shaped jacket, a locking body, a plurality of steel balls, a spring, and a spring base. The locking body is set inside the tooth-shaped jacket; a plurality of spherical recesses are provided on the circumference of the neck of the locking body and steel balls are contained in the spherical recess; the radial positioning between the locking body and the tooth-shaped jacket is realized through the steel balls; an annular groove is provided at the rear end of the locking body and the annular groove has a snap ring in it; the rear end of the locking body is equipped with a spring base, the axial positioning between the spring base and the locking body is realized through the snap ring, and the spring base is connected to one end of the spring and the other end of the spring presses against the inside of the tooth-shaped jacket.

The front end of the tooth-shaped jacket has a tooth profile and the tooth profile of the tooth-shaped jacket mates with the tooth profile set on the electric tool.

The rear end of said locking body mates with the input shaft assembly in the front of the angle adjuster.

The invention integrates the axial restraint and rotation of the angle adjuster into a body, which effectively simplifies the operation of the connection device without the inconveniences associated with the connection and rotation of the angle adjuster.

The invention realizes quick, stepless connection between the electric tool and the angle adjuster and enables the angle adjuster to rotate freely.

The invention not only saves materials and reduces the space used, but also makes the Operation of the angle adjuster on the electric tool more efficient and convenient.

BRIEF DESCRIPTION OF THE DRAWINGS

The following further describes the invention in conjunction with the drawings and a particular embodiment.

DETAILED DESCRIPTION OF PREFERRED EMBODIMENTS

Figure 1:
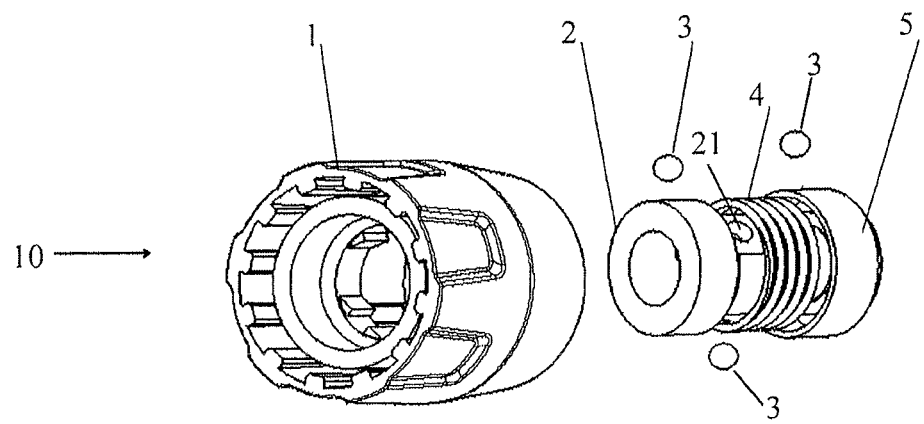
FIG. 1 is a partially exploded perspective view of an embodiment of a connecting device for connecting an electric tool with an angle adjuster.
Figure 2:
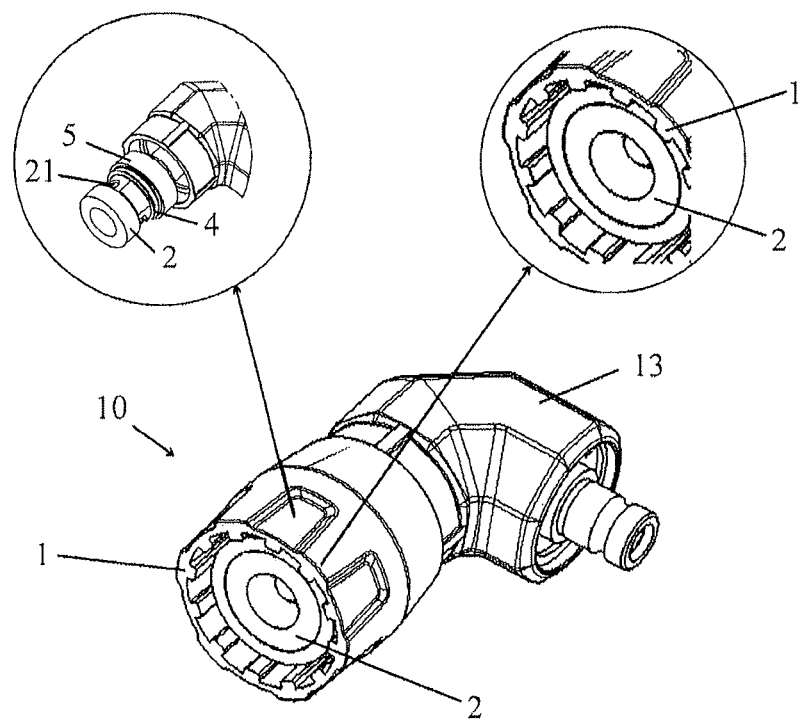
FIG. 2 is a schematic perspective view showing an embodiment of a connection device connected to an angle adjuster.

As shown in FIG. 1 and FIG. 2, an embodiment of a connecting structure-containing connection device 10 of an electric tool 11 for connection with an angle adjuster 13 comprises a tooth-shaped jacket 1, a locking body 2, three steel balls 3, a spring 4, and a spring base 5.

Figure 3:
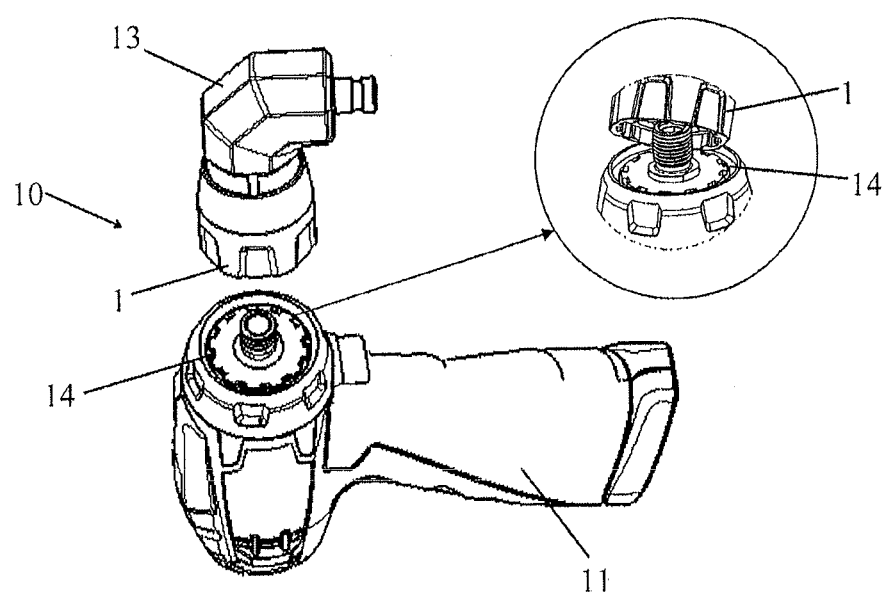
FIG. 3 is a partially exploded perspective view schematically illustrating connection of an angle adjuster to an electric tool using an embodiment of a connection device which is shown connected to the angle adjuster.

The front end of said tooth-shaped jacket 1 has a tooth profile, the tooth profile of the tooth-shaped jacket 1 mates with a mating tooth profile 14 provided on the electric tool as shown in FIG. 3, and the tooth-shaped jacket 1 is internally equipped with the locking body 2.

As shown in FIG. 3, three spherical recesses 21 are emplaced around the circumference of the neck of the locking body 2, steel balls 3 are contained in the spherical recess 21, the radial positioning between the locking body 2 and the tooth-shaped jacket 1 is realized through steel balls 3.

An annular groove 22 is equipped at the rear end of the locking body 2 and the annular groove 22 is internally equipped with a snap ring 6.

The rear end 26 of the locking body 2 is equipped with a spring base 5, the axial positioning between the spring base 5 and the locking body 2 is realized through the snap ring 6, and the spring base 5 is connected to one end of the spring 4 and the other end of the spring 4 presses against an inside surface 16 of the tooth-shaped jacket 1.

In use, the rear end of the locking body 2 is connected to the input shaft assembly in the front of the angle adjuster and the tooth profile at the front of the tooth-shaped jacket 1 is connected to the electric tool 11.

Figure 4:
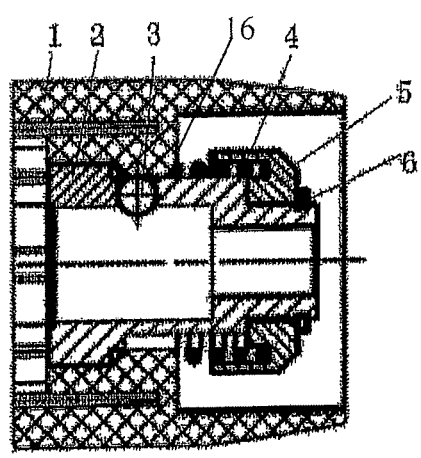
FIG. 4 is a longitudinal cross-sectional view of the embodiment of FIG. 1.
Figure 5:
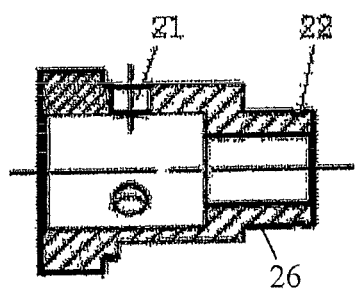
FIG. 5 is a longitudinal cross-sectional view of a locking body.

As shown in FIG. 4 and FIG. 5, the spring 4 on the spring base 5 first pushes the steel balls 3 that are set on the locking body 2, and the steel balls 3 in turn push the locking body 2 and the angle adjuster so that they snap to fit into each other to achieve axial restraint; then a quick connection with the electric tool 11 is realized through the tooth-shaped jacket 1, and thus the axial restraint connection between the electric tool 11 and the angle adjuster is realized.

The spring 4 can realize free rotation of the angle adjuster, making it easier to rotate the angle adjuster. The angle of rotation of the angle adjuster 13 can be controlled through the quantity of inner teeth on the tooth-shaped jacket 1 and the angle between the teeth. The smaller the angle between the teeth, the finer the adjustment of the angle of rotation.

The invention realizes stepless connection through the tooth profile on the tooth-shaped jacket 1 and the corresponding tooth profile 14 on the electric tool 11, without the necessity of positioning and fitting the connection bushing at a correct angle; the quantity of teeth can be determined as required, the larger the quantity of teeth, the smaller the angle of rotation and the larger the rotation scope of the angle adjuster 13, and the densely distributed tooth profiles can make the rotation of the angle adjuster more convenient; in addition, the internal locking body can conveniently and quickly snap onto the electric tool to complete axial restraint through squeezing of the spring on the steel balls.

Making the connection and rotation of the angle adjuster simpler and more practical, the invention is suitable for mass production and can widely be applied to various electric tools.

What is claimed is:

1. A connecting device for connecting an electric tool with an angle adjuster, said device comprising:

a tooth-shaped jacket having a front end which includes an internal tooth profile which is mateable with a mating tooth profile of the electric tool;

a locking body inside said tooth-shaped jacket, said locking body including a plurality of recesses emplaced around a circumference of said locking body, said locking body being having a rear end which connects to the angle adjuster;

a plurality of balls;

disposed radially between said recesses and said tooth shaped jacket, each said balls being received in a respective one of said recesses;

a spring base mounted to said locking body;

a spring disposed between said spring base and an inside surface of said tooth-shaped jacket;

said tooth-shaped jacket being axially movable relative to said locking body to axially and rotationally connect the angle adjuster and the electric tool by moving said tooth-shaped jacket axially relative to said locking body in a first axial direction to cause said spring to push on said balls by way of said tooth-shaped jacket to forcibly extrude said balls from said recesses to achieve axial restraint between the angle adjuster and the electric tool and cause said internal tooth profile of said tooth-shaped jacket to mate with the mating tooth profile of the electric tool to prevent relative rotational movement between the angle adjuster and the electric tool;

said tooth-shaped jacket being axially movable relative to said locking body to axially and rotationally disconnect the angle adjuster from the electric tool by moving said tooth-shaped jacket axially relative to said locking body in a second axial direction to cause said axial restraint to be relieved by relieving said pushing on said balls and to cause said internal tooth profile of said tooth-shaped jacket to unmate from the mating tooth profile of the electric tool to permit relative rotational movement between the angle adjuster and the electric tool.

2. A device as claimed in claim 1, wherein a stepless connection is realized through engagement between said internal tooth profile of said tooth-shaped jacket and said mating tooth profile of the electric tool.

* * * * *